United States Patent Office 3,605,995
Patented Sept. 20, 1971

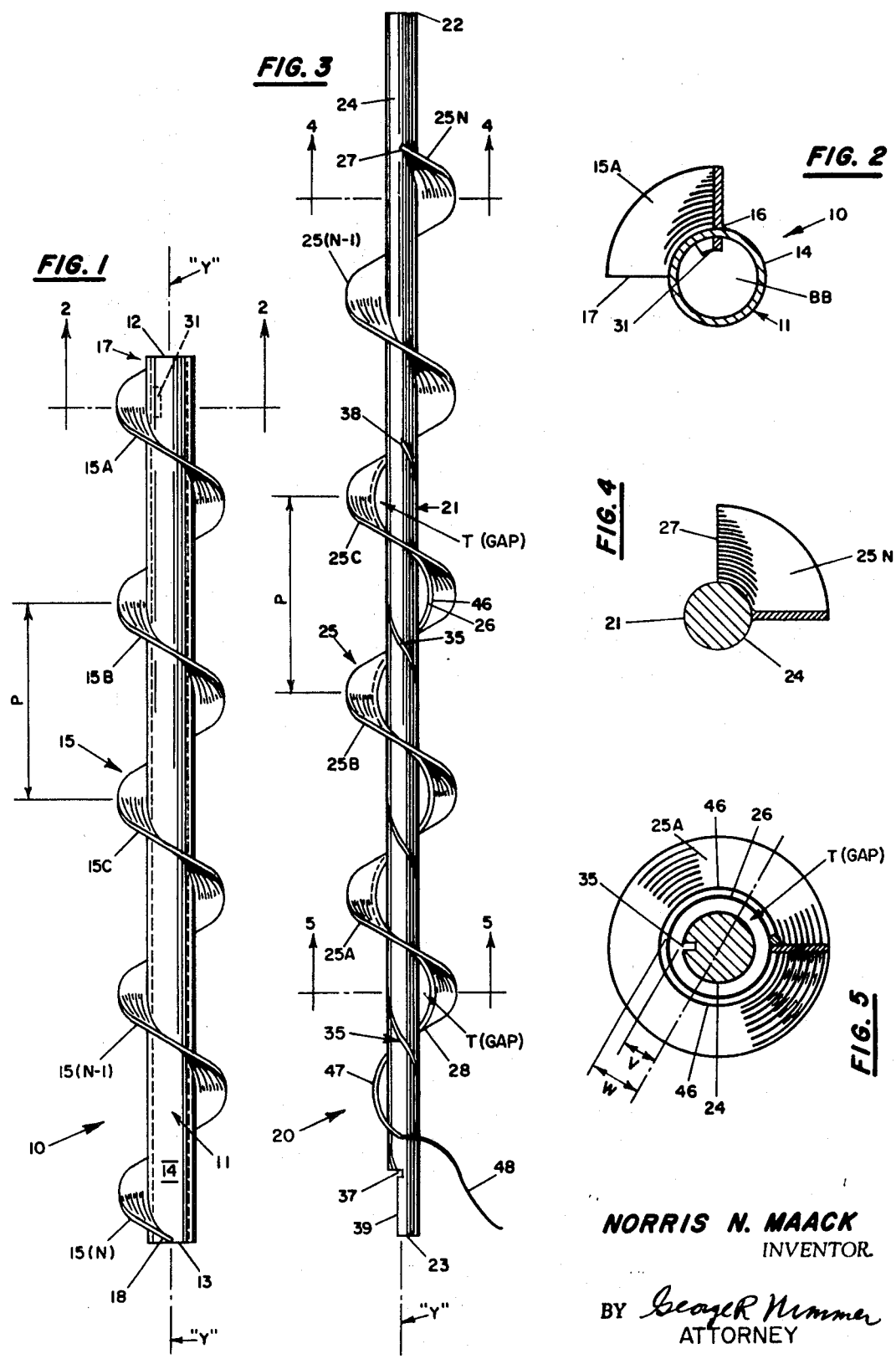

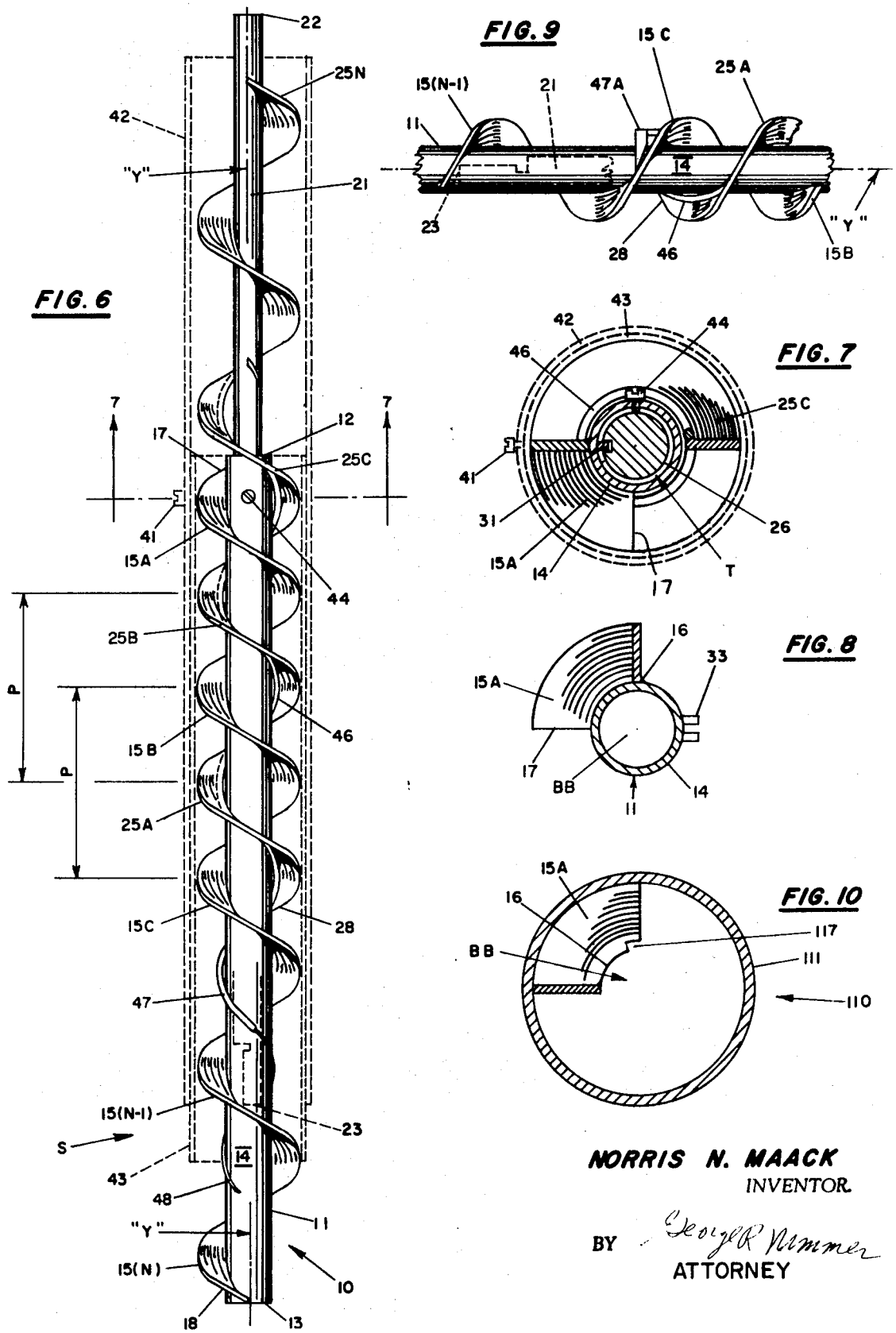

3,605,995
LONGITUDINALLY EXTENDABLE SCREW FEED DEVICE
Norris N. Maack, R.R. 3, Box 66,
West Point, Nebr. 68788
Filed Apr. 8, 1970, Ser. No. 26,651
Int. Cl. B65g 33/00
U.S. Cl. 198—213                                    11 Claims

ABSTRACT OF THE DISCLOSURE

An auger-like screw feed device wherein the longitudinally extending length can be selectably varied within a continuous range. The screw-feed device comprises a pair of telescoping auger sections each disposed along a longitudinally extending axis including a first-auger section having an axial bore extending forwardly from the rearward end thereof, and further including a second-auger section having an axial shaft that enters the rearward end of the first-auger section axial bore; the forward-length portion of the second-auger section's helical flighting is radially spatially separated from the second-auger axial shaft whereby rotation of the second-auger axial shaft about the longitudinal axis allows telescoping relative movement between the pair of auger sections, to attain the selected length for the screw feed device.

---

Auger-like screw feed devices have long been employed to transport cereal grain, finely-divided coal, and similar comminuted or particulate solids along a longitudinally extending axis. Such auger-like screw feed devices generally comprise an elongate shaft disposed along a longitudinally extending axis together with a helical flighting concentrically surrounding the longitudinal axis and secured as by welding to the elongate shaft. If at least the forward portion of an auger-like screw feed device extends into a source-site of a comminuted solid material, rotation of the auger-like device about the elongate axis thereof, as by a motor or similar powered rotation means, the comminuted material is rearwardly transported in helical fashion to an awaiting rearwardly-positioned collection-site, such as a truck, dumping site, or the like. Oftentimes during a materials handling operation the longitudinal distance between the forward source-site and the rearward collection-site changes, either abruptly or gradually, and the overall length of the auger-like screw feed might need to be periodically changed accordingly. In the prior art, the prevalent means of changing the overall length of an auger-like screw feed is to provide a plurality of auger sections which are removably attached together in end-to-end relationship. However, such prior art means suffer from the deficiencies in that it is exceedingly slow and cumbersome to attach and detach the individual end-to-end auger sections; moreover, attainable overall lengths are not continuous, but rather, only in finite increments according to the length of the individual auger sections.

It is accordingly the general object of the present invention to provide an auger-like screw feed device of selectable elongate length that overcomes the deficiencies of prior art longitudinally extendable screw feed devices.

It is a specific object of the present invention to provide an auger-like screw feed device, the length thereof being easily-selectably variable within a continuous length range.

It is another object to provide a longitudinally variable length auger-like screw feed device that is of reliable and dependable performance for various types of materials handling operations, for various source-site and collection-site environments, and for various types flowable materials including comminuted solids and slurrified particulate solids.

With the above and other objects and advantages in view, which will become more apparent as this description proceeds, the longitudinally extendable screw-feed device of the present invention includes a pair of auger sections each being positioned along a longitudinally extending elongate axis and being telescopically longitudinally engaged with each other, the second-auger section comprising a longitudinal shaft positioned along and rotatable about the elongate axis and having a forward portion including a forward end extending forwardly into the longitudinal axis bore of the first-auger section, the second-auger section further comprising a helical second-flighting having a helical pitch similar to the pitch of the first-flighting on the first-auger section, said second-flighting having an elongate forward-length portion surrounding and radially spatially separated from the elongate shaft of the second-auger section, spacer means to maintain a given longitudinal-spacing (such as a half-pitch) between successive helices of the first-flighting and intervening helices of the second-flighting, length stabilization means to stabilize the selected longitudinal relationship between the first-auger and the second-auger, and anti-wobble means to maintain the second-flighting forward-length portion substantially concentric about the elongate axis.

In the drawing, wherein like characters refer to like parts in the several views, and in which:

FIG. 6 is an elevational view of a typical form of the longitudinally extendable screw feed device of the present invention comprising the representative second-auger section of FIG. 3 telescopically engaged with the representative first-auger section of FIG. 1.

FIG. 7 is a sectional elevational view taken along line 7—7 of FIG. 6.

FIG. 1 is an elevational view of a representative form of the first-auger section component of the FIG. 6 embodiment.

FIG. 2 is a sectional elevational view taken along line 2—2 of FIG. 1.

FIG. 3 is an elevational view of a representative form of the second-auger section component of the FIG. 6 embodiment.

FIG. 4 is a sectional elevational view taken along line 4—4 of FIG. 3.

FIG. 5 is a sectional elevational view taken along line 5—5 of FIG. 3.

FIG. 8 is a sectional elevational view similar to FIG. 2 showing an alternate spacer means for the present invention.

FIG. 9 is a detail elevational view showing an alternate anti-wobble means for the present invention.

FIG. 10 is a sectional elevational view similar to FIG. 2 for an alternate type first-auger section.

As can be clearly seen in the drawing, the longitudinally extendable screw feed device, e.g. S, is disposed along a longitudinally extending elongate axis Y and comprises a pair of longitudinally telescopically engaged auger sections each of which is disposed along axis Y and including first-auger section, e.g. 10, 110, and second-auger section, e.g. 20.

Representative embodiment S of the screw feed device shown in FIGS. 1–7 will now be described in detail. The embodiment S comprises first-auger section 10 and second-auger section 20. First-auger section 10, which is shown alone in FIGS. 1 and 2 and shown in assembly in FIGS. 6–8, is disposed along axis Y and is provided with an elongate axial bore BB extending forwardly from the first-auger rearward end 12. First-auger section 10 comprises a circularly tubular elongate first-shaft 11 having a rearward end at 12 and having a forward end at 13. First-shaft 11 has an outside wall 14 having a radial distance V from axis Y, the internal annular wall of first-shaft 11 defining axial circular bore BB of said radius V. There is a helical first-flighting 15 for first-auger section 10, the said first-flighting 15 having a given regular-pitch P between successive helices thereof, e.g. helices 15A, 15B, 15C . . . 15(N–1), and 15N. First-flighting 15 has an internal helical extremity 16 spaced substantially the said constant radial distance W from axis Y, and first-flighting 15 is attached to first-shaft 11, herein as by helical welding between helical internal extremity 16 and the circular outside wall 14 of first-shaft 11. The first-flighting has a rearward-end 17 substantially at 12 and has a forward end 18 substantially at 13. Although the first-flighting 15 and second-flighting 25 herein are shown of lefthand thread, both flightings might be chosen for righthand thread without departing from the spirit of the present invention.

Referring now to FIGS. 3–5 which show the representative embodiment 20 of the second-auger section. Second-auger section 20 is disposed along axis Y and comprises an elongate second-shaft 21 that is of circular transverse cross-sectional shape defined by second-shaft outside elongate surface 24. The outside diameter for the second-shaft forward elongate portion, e.g. extending longitudinally between second-shaft forward end 23 and helix 25(N–1), is less than the diameter substantially 2V of the first-shaft axial bore BB, and the said second-shaft forward portion extends forwardly into first-shaft axial bore BB whereby second-shaft forward end 23 is disposed between the first-shaft extremities 12 and 13. Moreover, second-shaft rearward end 22 is located remotely rearwardly of first-shaft rearward end 12. There is a helical second-flighting 25 for first-auger section 20, the said second-flighting also having the given regular-pitch P between successive helices thereof, e.g. helices 25A, 25B, 25C . . . 25(N–1), and 25N. Second-flighting 25 has a rearward end 27 substantially at 22 and has a forward end 28. The only affirmative attachment, e.g. by welding or any type means, between second-flighting 25 and second-shaft 21 is at the rearward portions of second-flighting 25, e.g. rearwardly remote of forward end 28 and herein rearwardly of helix 25C at helices 25(N–1) and 25(N). Moreover, as exemplified in FIG. 5, the entire forward-length portion of second-flighting 25 has an internal helical extremity 26 spaced a substantially constant radial distance T at least equal to substantially $(W-V)$ from second-shaft elongate outer surface 24. Thus, there is a radial gap T or T(Gap) extending continuously uninterruptedly from the second-flighting forward extremity 28 to the rearwardly remote attachment between second-flighting 25 and second-shaft 21.

Thus, from the two immediately preceding paragraphs, it can be readily appreciated that: if the circularly tubular first-shaft 11 has an axial bore BB with an inside radius V and has an outside radius W; if the internal helical extremity 16 of first-flighting 15 is disposed at said radial distance W from longitudinal axis Y and attached at the first-shaft outward surface 14, said first-flighting having some regular-pitch P; if the forward portion of circular second-shaft 21 has an elongate outside surface 24 spaced a distance just slightly less than V from axis Y and has a second-shaft forward end 23 disposed within axial bore BB just forwardly of first-shaft rearward end 12; and if the second-flighting 25 of regular-pitch P has an internal helical extremity 26 disposed a constant radial gap T at least substantially equal to $(W-V)$ from elongate surface 24, said gap extending continuously uninterruptedly from the second-flighting forward end 28 to some rearward position, e.g. rearwardly of helix 25C; then (assuming that the first-shaft 11 is stationary about and along axis Y), second-shaft 21 can be moved forwardly along axis Y with respect to first-shaft 11 (when accompanied by twisting of the radially smaller second-shaft 21 within larger axial bore BB), whereupon the helical inward extremity 26 of second-flighting 25 moves selectively progressively forwardly along first-shaft outside elongate surface 14 to provide longitudinally telescoping engagement between first-auger section 10 and second-auger section 20. Further and desirable features might include: spacer means, e.g. 31 and 35, 33, etc., to maintain a given longitudinal-spacing between successive helices of the first-flighting and intervening helices of the second-flighting; length stabilization means to stabilize the selected longitudinal relationship between the first-auger and the second-auger; a longitudinally telescoping conduit-like duct means surrounding the telescopically engaged auger sections; and anti-wobble means to maintain the second-flighting forward-length portion (which is spatially separated from the second-shaft) substantially concentric about axis Y.

One type spacer means, as alluded to in FIGS. 1–7, comprises a helically grooved portion 35 along the outside surface of second-shaft 21, said helical groove 35 having said regular-pitch P and being disposed midway between successive helices of second-flighting 25. The rearward terminus 38 of helical groove 35 is herein disposed between helices 25C and 25(N–1), it being arbitrarily decided herein that the shortest permissible length for screw feed device S be substantially equal to lengths (13 to 12) plus (36 to 22). There is a helical rib portion 31 disposed within axial bore BB near the first-shaft rearward end 12, said helical rib 31 having said regular-pitch P although the length of helical rib 31 along axis Y is quite short and herein drastically less than P; said helical rib 31 is engageable with helical groove 35, and said thread-type engagement serves to maintain a given longitudinal-spacing, e.g. the desirable spacing ½P, between alternating helices of the first-flighting 10 and second-flighting 20. Initial alignment of separate auger-sections 10 and 20 at engageable groove 35 and rib 31 is facilitated when the second-shaft near the first end 23 thereat is longitudinally flattened as along 39 to fully clear rib 31 and when helical groove forward end 37 is at the rearward terminus of 39. Another type spacer means, as alluded to in FIG. 8, comprises a bifurcate lug 33 extending radially outwardly from attached to first-shaft 11 at the rearward end 12 thereof, said bifurcate lug 33 extending radially outwardly of elongate surface 14 diametrically opposite of first-flighting rearward end 17. If the first helix 25A of second-flighting 25 is made to pass through the said bifurcate lug 33, twisting of second-shaft 21 about axis Y will assure that each successive helix, e.g. 25B, 25C, etc., will also pass through said lug 33. The spacer means herein, especially when both the bifurcate lug 33 and the groove 35-rib 31 embodiments are combined within the same screw feed, ensure co-rotatable driving of both auger sections about axis Y for the selected length of a power-driven screw feed S.

Auger-like screw feed devices are customarily provided with a conduit or duct means that concentrally closely surrounds the successive helices, (but not at the terminal helices) to facilitate longitudinal feeding of the comminuted or particulate solid material, e.g. grain. For the longitudinally telescoping screw feed devices of the present invention, the conduit means is preferably likewise longitudinally telescoping. As alluded to in phantom lines in FIGS. 6 and 7, the longitudinally telescoping conduit might include a pair of slidably associated circular tubular sections including forward-section 43 and rearward-section 42, said sections 43 and 42 being temporarily maintainable in the selected length with set screw 41. Alternatively, rearward portions of the rearward-section 42 might be attached to rearward portions of second-auger section 20 while forward portions of forward-section 43 might be attached to forward portions of first-auger section 10 whereby the conduit means automatically conforms in length to the chosen length for the extendable screw feed.

There are length stabilization means to stabilize the selected longitudinal relationship between the telescoping auger sections. For example, a set screw 44 passing through first-shaft 11 near the rearward end 12 thereof might be used, the free end of set screw 44 being bearable against the elongate surface 24 of second-shaft 21. Alternatively, if the drive means for turning the auger sections 10 and 20 about axis Y is attached to the selectable length conduit means, e.g. 42–43, then the conduit means themselves could provide a length stabilization means for the screw feed device herein. Auxiliary length stabilization means might include lug 33, and mating helical groove and rib, e.g. 35 and 31.

The generic principle of this invention rests upon the premise of the radial gap T between the helical inward extremity 26 for the second-flighting forward-length portion and the elongate outer surface 24 of second-shaft 21, i.e. the forward-length portion of second-flighting 25 is completely unattached to second-shaft 21 from second-flighting forward end 28 to some rearward point, as at helix 25(N–1). Accordingly, it has been found desirable to provide anti-wobble means to maintain the second-flighting forward-length portion substantially concentric about axis Y, i.e. to prevent radial movement thereof relative to first-shaft 11 while the revolving screw feed device longitudinally transports grain or similar flowable-solid material. One type anti-wobble means comprises a helical stiffener-rod 46 of circular cross-sectional shape weldably attached to the trailing surface of the second-flighting forward-length portion along the helical inward extremity 26 thereof, gap T being dimensionally undiminished by helical stiffener-rod 46. Helical stiffener-rod 46 might extend a length of ½P or more forwardly of forward end 28 to provide a helical curlicue-tip 47. Another type anti-wobble means might include a bendable metallic elongate wire 48 attached to a forward portion of second-flighting 25, as to curlicue-tip 47, said wire being securely wrappable around first-shaft 11. Yet another type anti-wobble means, as shown in the FIG. 9 detail view, is a non-helical curlicue-tip 47A. Unlike the previously described helical type 47, 47A does not lie midway between the first-flighting successive helices, but rather is flattened to loosely-abuttably anchor against a first-flighting helix, e.g. helix 15C. However, the anti-wobble means embodiment 47A does not easily lend itself to use with the spacer means alternate embodiment 33.

The alternate first-auger section 110 for the screw feed device comprises a tubular first-shaft 111 that surrounds and is attached to first-flighting 15. The inward helical extremity 16 of first-flighting 15 is provided with a helical grooved portion 117. The second-auger section for first-auger 110 differs from that of second-auger section 20 in that a helical rib would replace helical groove 35 on the second-shaft. The said helical rib would engage helical groove 117 to provide a spacer means for the screw feed device using first-auger embodiment 110.

From the foregoing, the construction and operation of the screw feed device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:
1. A longitudinally extendable screw feed device positioned along an elongate longitudinal axis and comprising a pair of elongate auger sections each positioned along said longitudinal axis, the first-auger section being longitudinally telescopically engaged with the second-auger section to provide selectable longitudinal lengthening and shortening of the screw feed device.

(A) the said first-auger section being provided with an elongate axial bore extending forwardly from the rearward end thereof, said first-auger comprising a longitudinal tubular member surrounding the elongate axis and having an axially open rearward end, and further comprising a helical first-flighting of a given regular-pitch attached to the said tubular member, the internal extremity of the first-flighting being spaced a substantially constant radial distance from and helically surrounding the elongate axis;

(B) the second-auger section comprising a longitudinal second-shaft positioned along the elongate axis and having a forward portion terminating as a forward end that extends forwardly into the rearward terminus of the first-auger axial bore, and further comprising a helical second-flighting having said given regular-pitch, said second-flighting including a forward-length portion surrounding and radially spatially separated from the longitudinal external side of the said second-shaft, said second-flighting being attached to the second-shaft rearwardly of the second-shaft forward-length portion whereby the radial spatial gap between the second-flighting helical internal extremity and the second-shaft extends continuously uninterruptedly from the second-flighting forward end to the said rearwardly remote attachment between the second-flighting and the second-shaft, the said second-shaft being rotatable about the elongate axis with respect to the first-auger section whereby helices of the second-flighting are positionable between consecutive helices of the first-flighting;

(C) anti-wobble means to maintain the second-flighting forward-length portion substantially concentric about the elongate axis; and (D) length stabilization means to stabilize the selected longitudinal relationship between the first-auger section and the second-auger section.

2. The longitudinally extendable screw feed device of claim 1 wherein the tubular member of the first-auger is an axial first-shaft; and wherein the helical internal extremity of the first-flighting surrounds and is attached to the longitudinal external side of the first-shaft.

3. The longitudinally extendable screw feed device of claim 2 wherein there are spacer means to maintain a given longitudinal-spacing between successive helices of the first-flighting and the intervening helices of the second-flighting.

4. The screw feed device of claim 3 wherein the spacer means comprises the combination of helically grooved portion of said given regular-pitch on the second-shaft positioned between successive helices of the second-flighting forward-length portion, together with a relatively short-length helical internal rib for the first-shaft near the rearward end thereof.

5. The screw feed device of claim 3 wherein the spacer means comprises a bifurcate fork-like lug on the first-shaft external side near the first-shaft rearward end whereby the second-flighting is guided by said forked lug as the second-shaft is rotated about the elongate axis with respect to the first-auger section.

6. The screw feed device of claim 4 wherein the spacer means additionally comprises a bifurcate fork-like lug on the first-shaft external side near the first-shaft rearward end to guide the second-flighting and to provide a degree of length stabilization for the screw feed device.

7. The screw feed device of claim 3 wherein the anti-wobble means includes a helical stiffener-rod attached along the second-flighting inward terminus, said helical stiffener-rod extending forwardly from the second-flighting as a curlicue-tip, there being a continuous uninterrupted radial spatial gap between the helical stiffener-rod and the second-saft.

8. The screw feed device of claim 7 wherein there is a flexible wire attached to the said curlicue-tip, said flexible wire being securely wrappable about the first-shaft when the selected length of the screw feed has been attained, to supplement the stiffener-rod anti-wobble means.

9. The screw feed of claim 7 wherein the curlicue-tip is rearwardly flattened so as to contact the rearwardly adjacent helix of the first-flighting, to supplement the stiffener-rod anti-wobble means.

10. The screw feed device of claim 1 wherein there is longitudinally telescoping conduit means surrounding the said telescopically engaged auger sections, said conduit being adapted to substantially equal the selected length for the screw feed.

11. The screw feed device of claim 10 wherein the length stabilization means includes a set screw passing through an axial first-shaft tubular member for the first-auger and bearable against the second-auger second-shaft.

References Cited
UNITED STATES PATENTS 2,845,167  7/1958  Heiken.

RICHARD E. AEGERTER, Primary Examiner